United States Patent
Xie et al.

(10) Patent No.: US 11,872,611 B2
(45) Date of Patent: Jan. 16, 2024

(54) VACUUM CRACKING APPARATUS FOR POWER BATTERY AND CRACKING METHOD THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Yinghao Xie, Foshan (CN); Haijun Yu, Foshan (CN); Banglai Ming, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(*) Notice: Subject to any disclaimer, the term of this patent is extended or adjusted under 35 U.S.C. 154(b) by 0 days.

(21) Appl. No.: 18/042,765

(22) PCT Filed: Apr. 30, 2021

(86) PCT No.: PCT/CN2021/091572
§ 371 (c)(1),
(2) Date: Feb. 23, 2023

(87) PCT Pub. No.: WO2022/041823
PCT Pub. Date: Mar. 3, 2022

(65) Prior Publication Data
US 2023/0226582 A1    Jul. 20, 2023

(30) Foreign Application Priority Data
Aug. 24, 2020   (CN) .......................... 202010858434.0

(51) Int. Cl.
*B02C 4/02*     (2006.01)
*B09B 3/40*     (2022.01)
(Continued)

(52) U.S. Cl.
CPC .................. *B09B 3/40* (2022.01); *B01J 19/20* (2013.01); *B02C 4/08* (2013.01); *B02C 19/186* (2013.01);
(Continued)

(58) Field of Classification Search
CPC .......... B02C 19/186; B02C 23/38; B02C 4/08
See application file for complete search history.

(56) References Cited

U.S. PATENT DOCUMENTS

| 8,800,898 B2 * | 8/2014 | Alford .................... B02C 23/30 241/23 |
| 2011/0121112 A1 * | 5/2011 | Alford ..................... B09B 3/40 241/24.1 |

FOREIGN PATENT DOCUMENTS

| CH | 678131 A5 | 7/1991 |
| CN | 201593035 U | 9/2010 |

(Continued)

OTHER PUBLICATIONS

International Search Report and Written Opinion in PCT/CN2021/091572 dated Aug. 24, 2020.
(Continued)

*Primary Examiner* — Faye Francis
(74) *Attorney, Agent, or Firm* — Buchalter; Jason W. Croft

(57) ABSTRACT

The invention discloses a vacuum cracking apparatus for a power battery and a cracking method thereof. The cracking device includes a cylinder and further includes a rolling device, a first sealing device, a cracking device, a second sealing device, a pyrolysis device and a third sealing device
(Continued)

which are arranged from top to bottom. The cracking device for the power battery of the present invention is equipped with the first sealing device, the second sealing device and the third sealing device to isolate the cracking device from the pyrolysis device and be capable of realizing material transmission and gas isolation without interference with each other, so that gas stirring between an anaerobic zone and an aerobic zone is avoided; and by combing battery cracking and battery pyrolysis, with cracked gas discharged after cracking as a fuel for cracking and pyrolysis or preheating a pyrolysis device, resources are fully used.

6 Claims, 5 Drawing Sheets

(51) Int. Cl.
| | | |
|---|---|---|
| B09B 3/38 | (2022.01) | |
| B09B 3/35 | (2022.01) | |
| B01J 19/20 | (2006.01) | |
| B02C 4/08 | (2006.01) | |
| B02C 19/18 | (2006.01) | |
| B02C 23/38 | (2006.01) | |
| C10B 47/44 | (2006.01) | |
| C10B 53/00 | (2006.01) | |
| F23G 5/027 | (2006.01) | |
| F23G 5/033 | (2006.01) | |
| F23G 5/44 | (2006.01) | |
| F23G 7/00 | (2006.01) | |
| H01M 10/54 | (2006.01) | |
| B09B 101/16 | (2022.01) | |

(52) U.S. Cl.
CPC ............... *B02C 23/38* (2013.01); *B09B 3/35* (2022.01); *B09B 3/38* (2022.01); *C10B 47/44* (2013.01); *C10B 53/00* (2013.01); *F23G 5/0273* (2013.01); *F23G 5/033* (2013.01); *F23G 5/444* (2013.01); *F23G 7/003* (2013.01); *H01M 10/54* (2013.01); *B02C 2201/06* (2013.01); *B09B 2101/16* (2022.01); *F23G 2201/30* (2013.01); *F23G 2900/50204* (2013.01)

(56) References Cited

FOREIGN PATENT DOCUMENTS

| | | | | |
|---|---|---|---|---|
| CN | 102734807 | A | 10/2012 | |
| CN | 103450913 | A | 12/2013 | |
| CN | 204417409 | U | 6/2015 | |
| CN | 105509062 | A | 4/2016 | |
| CN | 107649491 | A | 2/2018 | |
| CN | 107774698 | * | 2/2018 | ............... B09B 3/40 |
| CN | 207602725 | U | 7/2018 | |
| CN | 108400400 | A | 8/2018 | |
| CN | 207775317 | U | 8/2018 | |
| CN | 109604024 | A | 4/2019 | |
| CN | 109890943 | A | 6/2019 | |
| CN | 109937096 | A | 6/2019 | |
| CN | 111151555 | A | 5/2020 | |
| CN | 111271711 | A | 6/2020 | |
| CN | 111841726 | A * | 10/2020 | ........... B02C 19/186 |
| CN | 112097274 | A | 12/2020 | |
| CN | 112139203 | A | 12/2020 | |
| CN | 112097274 | B | 10/2022 | |
| EP | 3804869 | A1 * | 4/2021 | ........... B02C 19/186 |
| GB | 2574833 | A | 12/2019 | |
| WO | 2022041823 | A1 | 3/2022 | |

OTHER PUBLICATIONS

First Search in Chinese Patent Application No. 202010858434.0 dated Aug. 2, 2022.
Notification to Grant Patent Right for Invention Chinese Patent Application No. 202010858434.0 dated Aug. 10, 2022.

* cited by examiner

VACUUM CRACKING APPARATUS FOR POWER BATTERY AND CRACKING METHOD THEREOF

CROSS-REFERENCE TO RELATED APPLICATION

This application is a national stage filing under 35 U.S.C. § 371 of international application number PCT/CN2021/091572, filed Apr. 30, 2021, which claims priority to Chinese patent application No. 202010858434.0, filed Aug. 24, 2020. The contents of these applications are incorporated herein by reference in their entirety.

TECHNICAL FIELD

The invention relates to the field of battery decomposition and extraction, and more particularly, to a vacuum cracking apparatus for a power battery and a cracking method thereof.

BACKGROUND

According to the statistics of the Ministry of Industry and Information Technology, the production and sales of new energy vehicles in China were 1,242,000 and 1,206,000 respectively in 2019. In 2019, the output of lithium-ion batteries was 15.72 billion, an increase of 4.0% over the previous year. The service life of a 3C small battery is generally 1-2 years, and that of a power battery is generally 3-5 years. A large number of battery applications will lead to scrapping of a large number of batteries. If waste batteries are not effectively treated, it will cause serious harm to the environment. The waste batteries contain organic substances such as diaphragm, binders and electrolytes, which need to be subjected to harmless treatment at a high temperature during treatment.

The traditional high-temperature treatment method is a method using aerobic pyrolysis or anaerobic cracking singly. The traditional aerobic pyrolysis method is easy to produce dioxin in the pyrolysis process, and there is a risk of secondary pollution; and the traditional anaerobic cracking method produces tar, coke and other products after cracking, the cracked products have a negative impact on the subsequent battery recycling process, and furthermore, cracking produces a lot of heat, which cannot be recovered. In view of the above problems, further improvement is needed.

SUMMARY

The present invention aims to solve at least one of the technical problems existing in the existing technology. Therefore, the present invention provides a vacuum cracking apparatus applied to a power battery, which combines aerobic pyrolysis with anaerobic cracking, can avoid secondary pollution and the impact of cracked products on subsequent processes, and can recover the heat after cracking.

In order to achieve the above objective, the following technical solution is employed:

provided is a vacuum cracking apparatus for a power battery, comprising a cylinder and components arranged sequentially from top to bottom:
  a rolling device, arranged in the cylinder, wherein the rolling device comprises a plurality of pressure rollers arranged at intervals in a vertical direction and a fifth driving device for driving rotation of the pressure roller;
  The first sealing device, arranged in the cylinder;
  a cracking device is arranged in the cylinder, wherein the cracking device comprises a first heater, a first air inlet, a first air outlet, and a pipeline, the first heater is arranged outside the cylinder to make the first heater to heat the outer surface of the cylinder, and the pipeline is connected with the first heater and the first air outlet;
  The second sealing device, arranged in the cylinder;
  a pyrolysis device is arranged in the cylinder and located below the second sealing device, wherein the pyrolysis device comprises a second heater, a second air inlet, a second air outlet, a first stirring paddle, and a first driving device for driving rotation of the first stirring paddle, the second heater is arranged outside the cylinder to make the second heater heat the outer surface of the cylinder, and the second heater is connected with the pipeline;
  The third sealing device, arranged in the cylinder.

According to some embodiments of the present invention, the cracking device further comprises a first screw arranged transversely, a second driving device, a barrel body, a propeller, a third driving device, and a first bottom plate. The second driving device is used for driving the first screw to rotate, the third driving device is used for driving the propeller to rotate, the barrel body is installed below the first screw, the first bottom plate is installed below the barrel body, and the propeller is located in the barrel body and installed on the first bottom plate; the diameter of the barrel body is smaller than that of the cylinder body, an opening of the barrel body faces downward, and a clearance space is formed between the opening of the barrel body and the first bottom plate; and a spindle of the propeller is hollow, wherein, a cracked material falls onto the second sealing device through the hollow portion of the spindle.

According to some embodiments of the present invention, an air guide hole is formed in each of the spindle and the barrel body.

According to some embodiments of the present invention, the first stirring paddle comprises a first shaft and a plurality of blade groups. The plurality of blade groups are distributed on the first shaft at intervals, each blade group comprises a plurality of first blades, and the plurality of first blades are circumferentially arranged on the outer surface of the first shaft at intervals.

According to some embodiments of the present invention, each of the first sealing device, the second sealing device, and the third sealing device comprises a circular column, a plug, and a fourth driving device, wherein the outer surface of the circular column is abutted against the inner surface of the cylinder, a guide groove is formed in the middle part of the circular column, the plug moves up and down along the guide groove, the fourth driving device is used for driving movement of the plug, and a plurality of pouring grooves are formed in the circular column and are connected with the guide groove and the bottom of the circular column respectively.

According to some embodiments of the present invention, each pressure roller is provided with a plurality of first hobbing teeth and a plurality of second hobbing teeth with the diameters smaller than those of the first hobbing teeth; and for every two pressure rollers, the first hobbing teeth of the upper pressure roller correspond to the second hobbing teeth of the lower pressure roller, and the second hobbing teeth of the upper pressure roller correspond to the first hobbing teeth of the lower pressure roller.

According to some embodiments of the present invention, a feeding device is arranged above the rolling device, is installed on the cylinder and comprises a feed hopper, a discharge port and a sixth driving device, a feed slot is formed in the feed hopper, the bottom of the feed slot is connected with the discharge port, the discharge port is connected with the cylinder, a second screw is arranged in the feed slot, and the sixth driving device is used for driving the second screw to rotate.

According to some embodiments of the present invention, the fourth driving device comprises a screw rod, a worm wheel, a worm and a first motor, a through hole is formed in the middle part of the plug and is provided with threads, the plug is connected with the screw rod, the screw rod is connected with the worm wheel, the worm wheel is connected with the worm, and the worm is connected with the first motor.

According to some embodiments of the invention, the upper end surface of the circular column is in a conical shape.

According to some embodiments of the invention, the main view shape of the plurality of blade groups installed on the first shaft is matched with the shape of the upper-end surface of the circular column of the third sealing device.

The present invention further provides a vacuum cracking method for the power battery, comprising the following steps:

(1) waste power batteries are fed from the feed hopper and then enter a roller press for rolling treatment to obtain the crushed material;

(2) the crushed material is transported to the cracking device for preheating, then heated and cracked under an inert atmosphere or vacuum to obtain cracked gas, solid cracked products and non-crackable products;

(3) the solid cracked products and the non-crackable products are transported to the pyrolysis device for pyrolysis at an aerobic atmosphere to obtain pyrolysis gas and non-pyrolysis products, wherein the pyrolysis gas is mainly composed of carbon dioxide and water vapor, and the non-pyrolysis products are mainly cathode material powder, anode material powder, copper powder, iron powder, aluminum powder and oxides of copper, iron and aluminum.

Preferably, the step (1) further comprises discharge treatment on the waste power batteries before rolling.

Preferably, in the step (1), a rolling pressure is 50-150 MPa, a rotating speed of rolling is 0.5-2 m/s, and a roller gap width of rolling is 5-50 mm.

Preferably, in the step (2), cracking is gradient cracking, gradient temperatures are 350-450° C., 450-550° C. and 550-650° C., and a cracking time is 0.2-5 h. Preferably, in the step (2), a heating rate is 3-10° C./min.

Preferably, in the step (2), the cracked gas is a mixture of C3-C12 alkenes and alkanes.

Preferably, in the step (2), a preheating temperature is 100-200° C.

Preferably, in the step (2), the inert atmosphere is nitrogen atmosphere; and a vacuum pressure is 10-30 kPa.

Preferably, in the step (2), the cracked gas is used as a fuel for pyrolysis in the step (3).

Preferably, in the step (3), a pyrolysis temperature is 400-600° C., a pyrolysis time is 0.5-5 h, a pyrolysis pressure is atmospheric pressure, the atmosphere is air or oxygen, and a rotating speed of a pyrolysis paddle is 5-60 r/min.

In the step (3), the cathode material powder is one of nickel cobalt lithium manganese, lithium iron phosphate or lithium manganese, and the anode material powder is one of graphite or lithium titanate.

Preferably, in the step (3), valuable metal elements such as metal Li, Ni, Co and Mn are further extracted from the cathode material powder or anode material powder by a hydrometallurgical methods commonly used in the art.

Beneficial Effects:

(1) For the vacuum cracking apparatus for the power battery of the present invention, the first sealing device, the second sealing device and the third sealing device are installed to isolate the cracking device from the pyrolysis device and be capable of realizing material transmission and gas isolation without interference with each other, so that gas stirring between an anaerobic zone and an aerobic zone is avoided, the yield of the cracked gas is increased, and production of harmful by-products is effectively avoided at the same time.

(2) The present invention combines battery cracking with battery pyrolysis with fully using the advantages and overcoming the disadvantages of both cracking and pyrolysis, for example, the harm of producing the dioxin by the traditional pyrolysis process is avoided by cracking the batter; and pyrolysis is conducted after cracking, and the tar and the coke produced after cracking are completely decomposed through aerobic pyrolysis, so that the problems of increasing acid and alkali consumption, solid waste residues and the difficulty of wastewater treatment and the like caused by the by-products of the traditional single cracking process to the subsequent process are solved; and by using the cracked gas discharged after cracking as the fuel for cracking and pyrolysis or preheating the pyrolysis device, resources are fully used.

(3) With a spiral cracking paddle design of the present invention in a vertical furnace, gradient temperature controlled cracking of the waste batteries may be realized by setting different temperatures at different positions of the heater of the cracking device in the process of upward transmission of materials, so that different kinds of organic substances in the waste battery are cracked step by step and finally completely cracked to obtain target cracked gas with a high calorific value.

(4) The present invention employs an integrated rolling, cracking and pyrolysis device to realize one-step fully closed rolling, cracking and pyrolysis of the waste battery, simplify the intermediate transmission link, effectively avoid dust escape, purify the sanitary environment of a workplace and increase the recovery rate of Ni, Co, Mn, Li and other metals.

BRIEF DESCRIPTION OF DRAWINGS

Additional aspects and advantages of the present invention will become apparent and easy to understand from the description of embodiments in combination with the following drawings, wherein.

Figure 1:
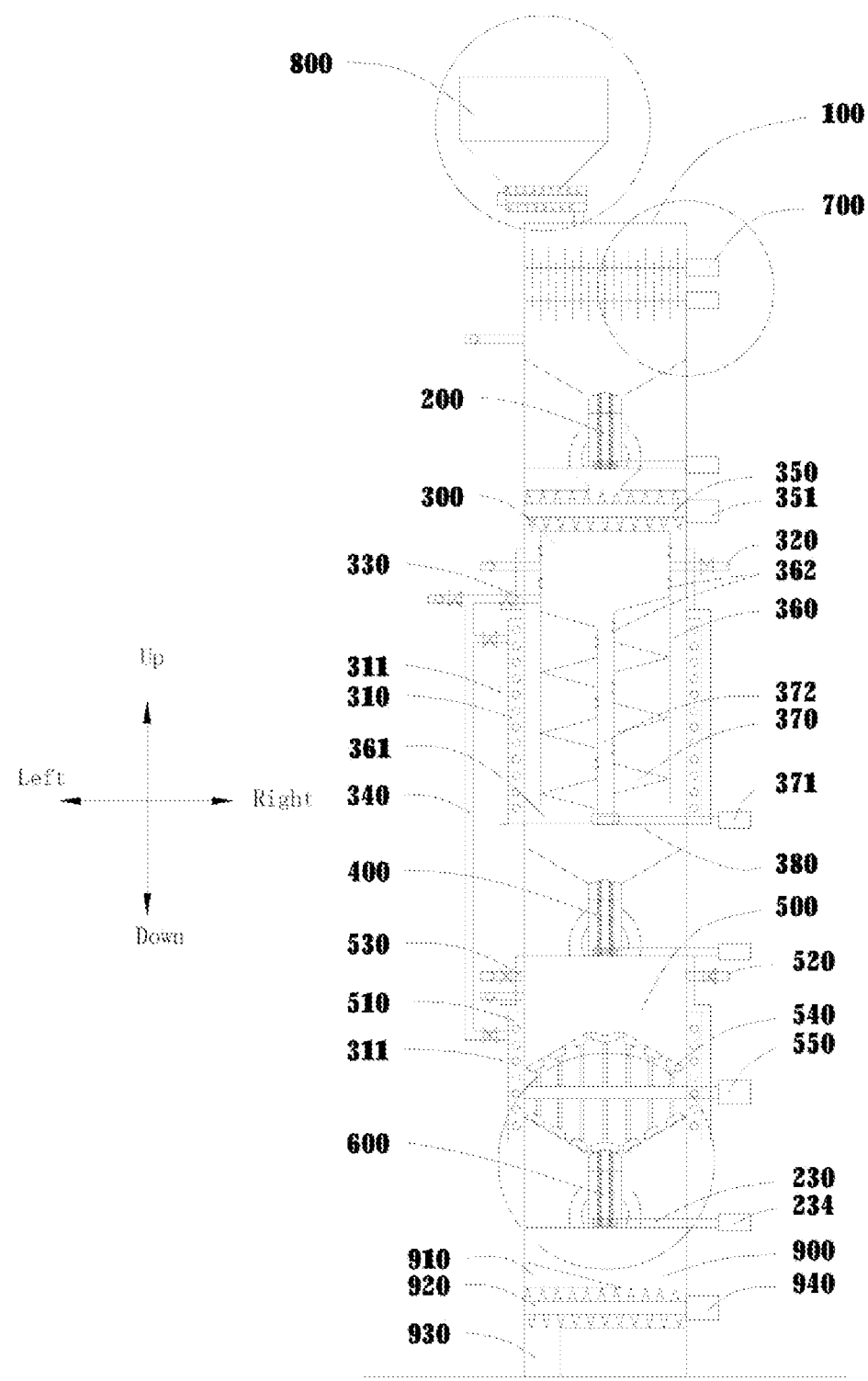
FIG. 1 is a schematic diagram of a front view structure of the interior of a cylinder of a vacuum cracking apparatus of a power battery according to the embodiment of the present invention.

Reference numerals: cylinder 100, first sealing device 200, circular column 210, guide groove 211, pouring groove 212, plug 220, through hole 221, fourth driving device 230, screw rod 231, worm wheel 232, worm 233, first motor 234, cracking device 300, first heater 310, heat insulation layer 311, first air inlet 320, first air outlet 330, pipeline 340, first screw 350, second driving device 351 barrel body 360, clearance space 361, air guide hole 362, propeller 370, third driving device 371, spindle 372, first bottom plate 380, second sealing device 400, pyrolysis device 500, second heater 510, second air inlet 520, second air outlet 530, first stirring paddle 540, first shaft 541, blade group 542, first blade 5421, first driving device 550, third sealing device 600, rolling device 700, pressure roller 710, first hobbing teeth 711, second hobbing teeth 712, fifth drive 720, feeding device 800, feed hopper 810, feed slot 811, discharge port 820, sixth driving device 830, second screw 840, discharging device 900, first stop block 910, third screw 920, discharge opening 930 and second motor 940.

DETAILED DESCRIPTION

Embodiments of the present invention are described in detail below, examples of which are illustrated in the accompanying drawings, in which the same or like reference numerals refer to the same or similar elements or elements having the same or similar functions throughout. The embodiments described below with reference to the accompanying drawings are exemplary and serve only to explain the invention and are not to be construed as limiting the invention.

In the description of the present invention, "several" device one or more, and "more" device more than two, "greater than", "less than", "exceeding" and the like are understood to exclude this number, and "above", "below", "within" and the like are understood to include this number. It is to be understood that the orientation or positional relationship related to the orientation description, such as upper, lower, front, rear, left, right and medium indications, is based on the orientation or positional relationship shown in the drawing. It is merely for the convenience of describing the present invention and simplifying the description and does not indicate or imply that the devices or elements referred to must have a particular orientation, be constructed and operate in a particular orientation, and therefore should not be construed as limiting the present invention.

In the description of the present invention, unless otherwise expressly defined, terms such as installation and connection shall be interpreted in a broad sense, and a person skilled in the art may reasonably determine the specific meaning of the above terms in the present invention in combination with the specific content of the technical scheme.

Referring to FIG. 1, the vacuum cracking device for the power battery according to the embodiment of the present invention comprises a cylinder (100) and following components sequentially arranged from top to bottom:

a rolling device 700, comprising a plurality of pressure rollers 710 arranged at intervals in a vertical direction and a fifth driving device 720 for driving rotation of the pressure rollers 710, wherein each pressure roller 710 is provided with a plurality of first hobbing teeth 711 and a plurality of second hobbing teeth 712 with the diameters smaller than those of the first hobbing teeth 711;

a first sealing device 200, arranged in the cylinder 100;

a cracking device 300, arranged in the cylinder 100 and comprising a first heater 310, a first air inlet 320, a first air outlet 330 and a pipeline 340, wherein the first heater 310 is arranged outside the cylinder 100 to make the first heater 310 to heat the outer surface of the cylinder 100, and the pipeline 340 is connected with the first heater 310 and the first air outlet 330;

a second sealing device 400, arranged in the cylinder 100;

a pyrolysis device 500, arranged in the cylinder 100 and comprising a second heater 510, a second air inlet 520, a second air outlet 530, a first stirring paddle 540 and a first driving device 550 for driving rotation of the first stirring paddle 540 of the vacuum cracking apparatus for the power battery, wherein the second heater 510 is arranged outside the cylinder 100 to make the second heater 510 to heat the outer surface of the cylinder 100 and is connected with the pipeline 340; and a third sealing device 600, arranged in the cylinder 100.

For example, as shown in FIG. 1, the cylinder 100 is placed vertically; the first heater 310 and the second heater 510 are cylindrical gas burners using cracked gas as a fuel, specifically, referring to existing cylindrical gas burners; the first sealing device 200, the second sealing device 400 and the third sealing device 600 are used for sealing the cracking device 300 and the pyrolysis device 500 and transporting materials, specifically, the first sealing device 200, the second sealing device 400 and the third sealing device 600 may be switching valves, or may be moving plates and a an air cylinder for driving movement of the moving plate in cylinder 100, wherein the moving plate moves left and right to realize functions of sealing and transportation; and the first driving device 550 may be a motor for driving a rotating cylinder;

Operating process: the waste batteries pass through the feed hopper 810 and then enter the rolling device 700. Firstly, the waste batteries pass through a rolling zone, are fractured or broken under the action of the pressure roller 710 and then enter a temporary storage zone; the first sealing device 200 is opened to enable the rolled batteries to fall into the cracking device 300, nitrogen is introduced through the first air inlet 320, and the first heater 310 is activated, so that the rolled batteries are heated in nitrogen so as to be cracked; in the process of cracking the batteries, cracked gas, solid cracked products and non-crackable products can be provided, the cracked gas is discharged into the pipeline 340 through the first gas outlet 330, the pipeline 340 continuously provides the cracked gas to the first heater 310 and preheats the first heater 310, so that the first heater 310 can be replenished with a fuel, and then the first heater 310 is ensured to continuously heat the crushed battery; after cracking, the second sealing device 400 is opened to enable the solid cracked products and the non-crackable products to fall into the pyrolysis device 500, then the first sealing device 200 and the second sealing device 400 are closed to seal the cracking device 300, And at the same time, the cracking device 300 cracks the next batch of waste batteries, so that continuous production of cracked gas is ensured, and then supply of the fuel to the first heater 310 and the second heater 510 is ensured; the pyrolysis device 500 introduces oxygen through the second air inlet 520 and starts the second heater 510 and the first stirring paddle 540 at the same time, so that the solid cracked products and the non-crackable products are continuously rolled in an oxygen-containing state, and then cracked products produced after cracking of the waste batteries are completely decomposed; and tail gas produced after pyrolysis is discharged from the pyrolysis device 500 through an exhaust port, and the pyrolyzed battery is discharged and cooled through the third sealing device 600 and then enters a next treatment procedure.

The vacuum cracking apparatus for the power battery according to the embodiment of the invention is equipped with the first sealing device, the second sealing device and the third sealing device to isolate the cracking device 300 from the pyrolysis device 500 and be capable of realizing material transmission and gas isolation without interference with each other, so that gas stirring between an anaerobic zone and an aerobic zone is avoided, the yield of the cracked gas is increased, and production of harmful by-products such as dioxin is effectively avoided at the same time; by combining battery cracking with battery pyrolysis, the advantages of battery cracking and battery pyrolysis are fully used, and the disadvantages of battery cracking and battery pyrolysis are overcome, for example, the batteries are cracked to avoid the harm of producing the dioxin by the traditional pyrolysis process; pyrolysis is conducted after cracking, and tar and cokes produced after cracking are completely decomposed through aerobic pyrolysis, so that the problems of increasing acid and alkali consumption, solid waste residue and the difficulty of wastewater treatment and the like caused by by-products of the traditional single cracking process to the subsequent process are solved; and by using the cracked gas discharged after cracking as a fuel for cracking and pyrolysis, resources are fully used.

In some embodiments of the present invention, as shown in FIG. 1, the cracking device 300 further comprises a first screw 350 transversely arranged, a second driving device 351, a barrel body 360, a propeller 370, a third driving device 371 and a first bottom plate 380. The second driving device 351 is used for driving the first screw 350 to rotate, the third driving device 371 is used for driving the propeller 370 to rotate, the barrel body 360 is installed below the first screw 350, the first bottom plate 380 is installed below the barrel body 360, and the propeller 370 is located in the barrel body 360 and installed on the first bottom plate 380; the diameter of the barrel body 360 is smaller than that of the cylinder 100, an opening of the barrel body 360 faces downward, and a clearance space 361 is formed between an opening of the barrel body 360 and the first bottom plate 380; and a spindle 372 of the propeller 370 is hollow, wherein a cracked material falls onto the second sealing device 400 through the hollow portion of the spindle 372. For example, during working, the second driving device 351 is started to enable the first screw 350 to rotate, the second sealing device 400, the first heating device and the third driving device 371 are open to enable the crushed waste batteries to fall onto the first screw 350, and the first screw 350 pushes the waste batteries to move to enable the waste batteries to fall onto the first bottom plate 380 from a space between the inner wall of the cylinder 100 and the outer surface of the barrel body 360, the waste batteries are heated by the first heater 310 in the falling process, and the waste battery at the bottom is lifted to the top of the propeller 370 by the rotating propeller 370, and since the spindle 372 of the propeller 370 is hollow, the waste battery on the top falls into the spindle 372 and waits for the second sealing device 400 to open; since the waste batteries are heated for the first time in the falling process and are lifted by the propeller 370 for the second time, the waste batteries are subjected to gradient cracking and full cracking so as to produce cracked gas with a high calorific value; the cracked gas with the high calorific value is led to the second heater 510 through the pipeline 340, so that the second heater 510 is preheated by the cracked gas with the high calorific value, so that a preheating time of the pyrolysis device 500 is reduced, and a pyrolysis speed is increased; and the second driving device 351 and the third driving device 371 may be motors for driving a rotating cylinder, a worm wheel is connected with the spindle 372, the worm 233 is connected with the worm wheel, and the worm 233 is connected with the motor.

In a further embodiment of the present invention, as shown in FIG. 1, an air guide hole 362 is formed in each of the spindle 372 and the barrel body 360 to discharge pyrolysis gas in the spindle 372 and pyrolysis gas in the barrel body 360.

Figure 2:
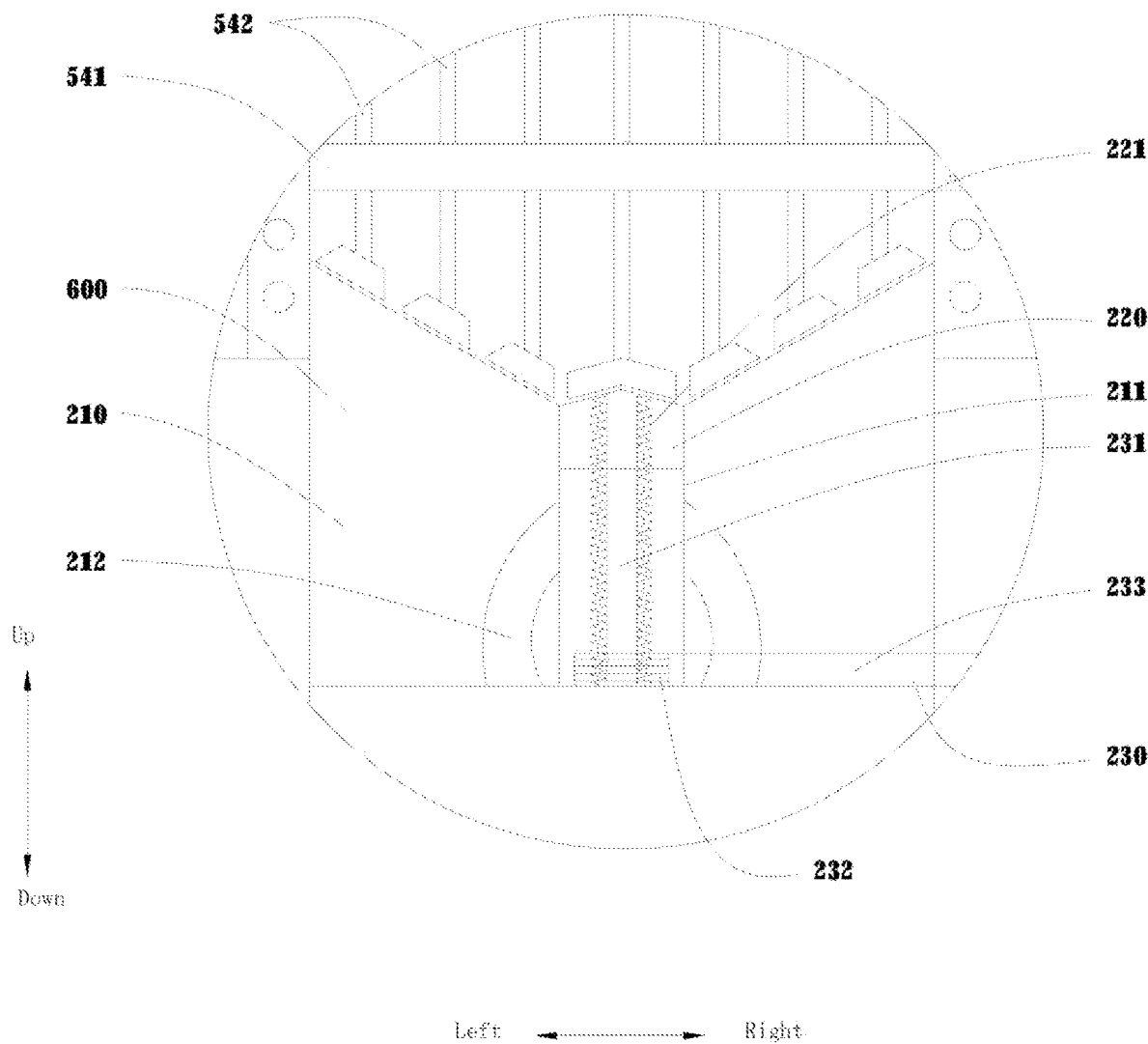
FIG. 2 is a partially enlarged structural diagram of connection between a third sealing device and a pyrolysis device shown in FIG. 1.

In a further embodiment of the present invention, as shown in FIGS. 1 and 2, the first stirring paddle 540 comprises a first shaft 541 and a plurality of blade groups 542. The plurality of blade groups 542 are distributed on the first shaft 541 at intervals, each blade group 542 comprises a plurality of first blades 5421, and the plurality of first blades 5421 are circumferentially arranged on the outer surface of the first shaft 541 at intervals; for example, the first stirring paddle 540 is arranged transversely, and a plurality of blade groups 542 are sequentially arranged on the first shaft 541 at intervals from left to right, each blade group 542 comprises a plurality of first blades 5421, the plurality of first blades 5421 take the first shaft 541 as the center and are circumferentially arranged on the outer surface of the first shaft 541 at intervals; and specifically, the amount of the plurality of blade groups 542 may be two, three or more, and the amount of the plurality of first blades 5421 may be two, three or more. When there are four first blades 5421, the four first blades 5421 are arranged in a cross; the plurality of blade groups 542 are arranged to continuously stir the cracked product to prevent product accumulation and refine the product, so that the refined product reacts with the second heater 510 and oxygen, and then the speed of pyrolyzing the product is increased; and the first blades 5421 of the blade group 542 located in the middle of the first shaft 541 are in a shape of "Y", and the first blades 5421 of the other blade groups 542 are in a shape of "T", so that the cracked product at the bottom is conveniently stirred.

In some embodiments of the present invention, as shown in FIGS. 1 and 2, the first sealing device 200, each of the second sealing device 400 and the third sealing device 600 comprises a circular column 210, a plug 220 and a fourth driving device 230, wherein the outer surface of the circular column 210 is abutted against the inner surface of the cylinder 100, a guide groove 211 is formed in the middle part of the circular column 210, the plug 220 moves up and down along the guide groove 211, the fourth driving device 230 is used for driving the plug 220 to move, and a plurality of pouring grooves 212 are arranged in the circular column 210 and are connected with the guide groove 211 and the bottom of the circular column 210 respectively. For example, the fourth driving device 230 may drive the air cylinder, or may be arranged in such a way that the plug 220 is connected with the screw 231, the screw 231 is connected with a driven wheel, the driven wheel is connected with a driving wheel through a chain, and the driving wheel is connected with the motor; during working, the fourth driving device 230 drives the plug 220 to move up and down in the guide groove 211, the plug 220 blocks the entry of the waste batteries when moving to the position higher than the pouring grooves 212, and the waste batteries flow below the circular column 210 through the corresponding pouring grooves 212 when the plug 220 moves to the position lower than the pouring grooves 212; and specifically, the pouring grooves 212 are "O" shaped grooves, and there may be one, two or more than two pouring grooves 212.

Figure 3:
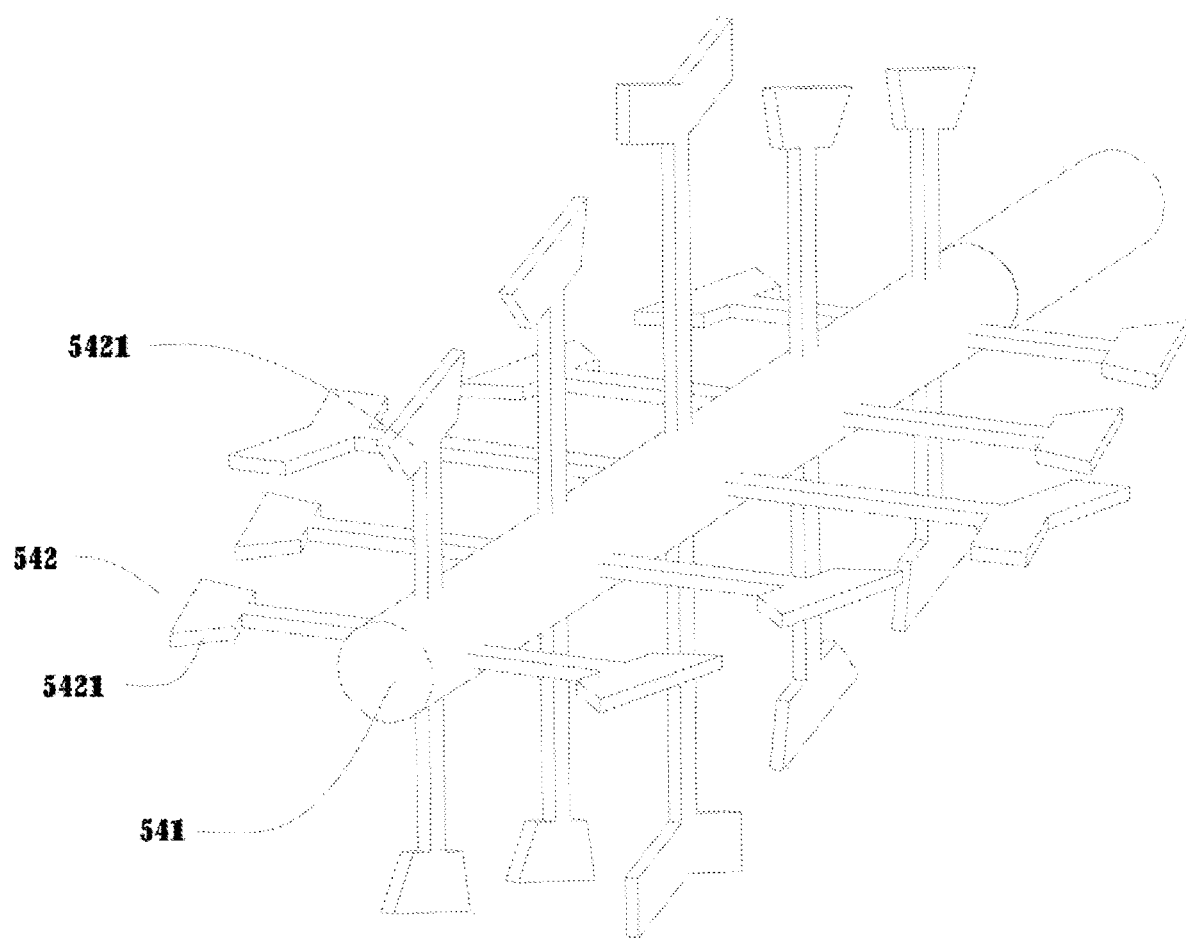
FIG. 3 is a schematic diagram of a structure of a first stirring paddle shown in FIG. 1.
Figure 4:
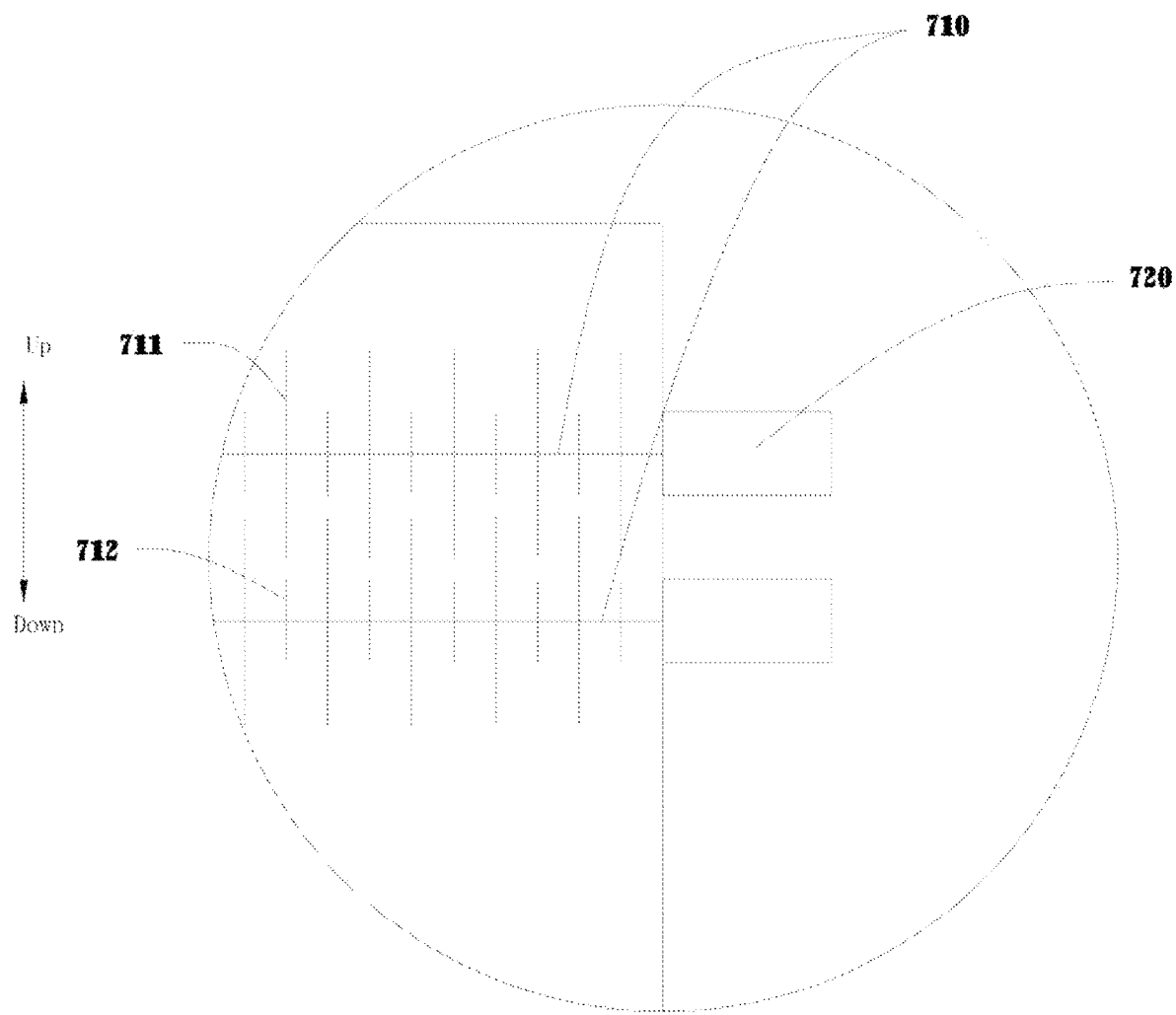
FIG. 4 is a partially enlarged structural diagram of a rolling device shown in FIG. 1.

In some embodiments of the present invention, as shown in FIGS. 1 and 3, for every two pressure rollers 710, the first hobbing teeth 711 of the upper pressure roller 710 correspond to the second hobbing teeth 712 of the lower pressure roller 710, and the second hobbing teeth 712 of the upper pressure roller 710 correspond to the first hobbing teeth 711 of the lower pressure roller 710. The rolling device 700 may be two mutually matched crushing rollers driven by the motor or three triangularly distributed crushing rollers driven by the motor. For example, there are two pressure rollers 710, the arrangement manner of the first hobbing teeth 711 and second hobbing teeth 712 on one pressure roller 710 is as follows: the first hobbing teeth 711, the second hobbing teeth 712, the first hobbing teeth 711, the second hobbing teeth 712, the first hobbing teeth 711, etc., while the arrangement of the first hobbing teeth 711 and second hobbing teeth 712 on the other pressure roller 710 is as follows: the second hobbing teeth 712, the first hobbing teeth 711, the second hobbing teeth 712, the first hobbing teeth 711, the second hobbing teeth 712, etc., and the two kinds of hobbing teeth are mutually matched to enable the waste batteries are broken or fractured between the two kinds of hobbing teeth. Specifically, a gap between every two hobbing teeth may be adjusted, and the breaking degree and the crushed particle size of the rolled batteries are controlled by adjusting the gap between every two hobbing teeth; the rolling device 700 is further provided with a pressure relief valve; and the fifth driving device 720 is a motor or a rotating cylinder.

Figure 5:
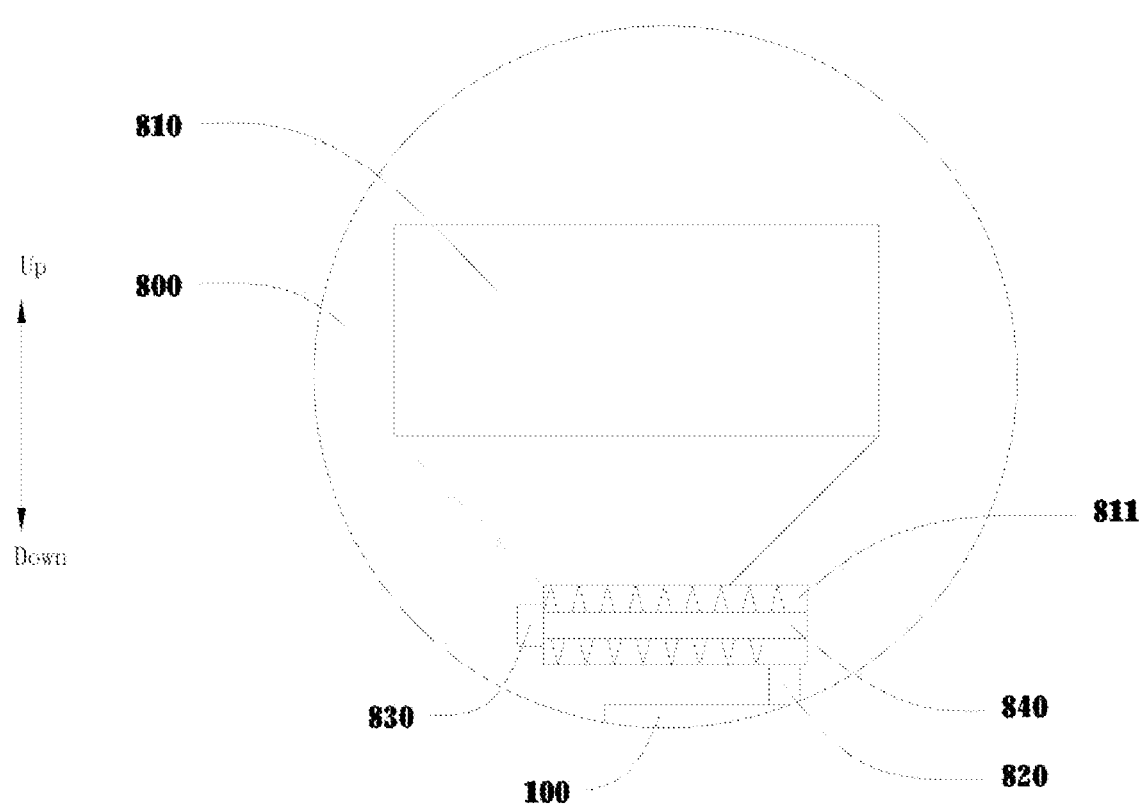
FIG. 5 is a partially enlarged structural diagram of a feeding device shown in FIG. 1.

In some embodiments of the present invention, as shown in FIGS. 1 and 5, a feeding device 800 is arranged above the rolling device 700, is installed on the cylinder 100 and comprises a feed hopper 810, a discharge port 820 and a sixth driving device 830. A feed slot 811 is formed in the feed hopper 810, the bottom of the feed slot 811 is connected with the discharge port 820, and the discharge port 820 is connected with the cylinder 100, a second screw 840 is arranged in the feed slot 811, and the sixth driving device 830 is used for driving the second screw 840 to rotate. During working, the sixth driving device 830 is started, the waste batteries are put into the feed hopper 810 and fall into the feed slot 811, and the second screw 840 pushes the waste batteries to move, so that the waste batteries fall onto the rolling device 700 through the discharge port 820; and the sixth driving device 830 may be a motor or a rotating cylinder.

In a further embodiment of the present invention, as shown in FIG. 2, the fourth driving device 230 comprises a screw 231, a worm wheel 232, a worm 233 and a first motor 234. A through hole 221 is formed in the middle part of the plug 220 and is provided with threads, the plug 220 is connected with the screw 231, the screw 231 is connected with the worm wheel 232, the worm wheel 232 is connected with the worm 233, and the worm 233 is connected with the first motor 234. During working, the first motor 234 is started to drive the worm 233 to rotate, the worm 233 drives the worm wheel to rotate, the worm wheel drives the screw 231 to rotate, and then the screw 231 drives the plug 220 to move up and down; and the worm wheel and the worm 233 are matched with the screw 231 so as to withstand the impact of falling of the waste batteries by using the self-locking characteristics of the worm wheel 232 and the worm 233.

In a further embodiment of the present invention, as shown in FIG. 2, the upper end surface of the circular column 210 is in a conical shape to guide the waste batteries to converge at the middle part of the circular column 210 for facilitating transmission of the waste batteries.

In a further embodiment of the present invention, as shown in FIG. 2, a main view shape of the plurality of blade groups 542 installed on the first shaft 541 is matched with the shape of the upper end surface of the circular column 210 of the third sealing device 600. Specifically, the upper end surface of the circular column 210 is in a conical shape, and the first stirring paddles 540 are in a "diamond" shape matched with the conical shape; and with such a structure, the cracked product at the bottoms of the first stirring paddles 540 is fully stirred.

In some embodiments of the present invention, as shown in FIG. 1, the outer surface of the first heater 310 and the outer surface of the second heater 510 are both provided with a heat insulation layer 311 to prevent hot gas loss and preserve heat.

In some embodiments of the present invention, as shown in FIG. 1, a discharging device 900 is arranged below the third sealing device 600 and comprises a first stop block 910, a third screw 920, a discharge opening 930 and a second motor 940. The third screw 920 is arranged below the first stop block 910, and the discharge opening 930 is located below the first stop block 910 and below the third screw 920, the second motor 940 is used for driving the third screw 920 to rotate; specifically, one end of the first stop block 910 is arranged on one side of the inner wall of the cylinder 100, the other end of the first stop block 910 extends to the middle part of the cylinder 100, and the first stop block 910 is in a shape of a right triangle; and during working, the pyrolyzed material falls onto the first stop block 910, falls onto the third screw 920 through an inclined plane of the first stop block 910 and is pushed by the third screw 920 to be discharged through the discharge opening 930.

The embodiment of the invention further provides a vacuum cracking method for the power battery, comprising the following steps that:

(1) after being discharged, waste power batteries are fed from the feeding device 800 and then enter the rolling device 700 with a pressure of 100 MPa and a rotating speed of 0.5-2 m/s for rolling treatment to obtain a crushed material;

(2) the crushed material is transported to the cracking device 300 through the first sealing device 200, preheated to 200° C., then heated to 350-450° C., 450-550° C. and 550-650° C. at a heating rate of CC/min and then subjected to gradient cracking for 2 h at an inert atmosphere to obtain mixed gas of C3-C12 alkenes and alkanes, solid cracked products and non-crackable products;

(3) the solid cracked products and non-crackable products are transported into the pyrolysis device 500 through the second sealing device 400 for pyrolysis for 4 h at air atmosphere and 500° C. to obtain pyrolysis gas and non-pyrolysis products, wherein the pyrolysis gas is mainly composed of carbon dioxide and water vapor, and the non-pyrolysis products are mainly cathode material powder, anode material powder, copper powder, iron powder, aluminum powder and oxides of copper, iron and aluminum.

In the description of this specification, reference terms "some embodiments", "it is contemplated" or the like mean that the particular features, structures, materials or characteristics described in connection with the embodiments or examples are included in at least one embodiment or example of the present invention. In this specification, the schematic representation of the above terms does not necessarily refer to the same embodiment or example. Moreover, the particular features, structures, materials or characteristics described may be combined in any suitable manner in any one or more embodiments or examples.

While the embodiments of the present invention have been shown and described, it will be understood by those of ordinary skilled in the art that: various changes, modifications, alterations and modifications may be made on these embodiments without departing from the principle and the spirit of the present invention, and the scope of the present invention is defined by the claims and their equivalents.

The invention claimed is:

1. A vacuum cracking apparatus for a power battery, comprising a cylinder and characterized by further comprising components sequentially arranged from top to bottom:
a rolling device, arranged in the cylinder and comprising a plurality of pressure rollers arranged at intervals in a vertical direction and a fifth driving device for driving rotation of the pressure rollers;
a first sealing device, arranged on the cylinder;
a cracking device, arranged in the cylinder and comprising a first heater, a first air inlet, a first air outlet and a pipeline, the first heater being arranged outside the cylinder to make the said first heater to heat the outer surface of the cylinder, and the pipeline being connected with the first heater and the first air outlet;
a second sealing device, arranged in the cylinder;
a pyrolysis device, arranged in the cylinder and comprising a second heater, a second air inlet, a second air outlet, a first stirring paddle and a first driving device for driving rotation of the first stirring paddle, the second heater being arranged outside the cylinder to make the second heater to heat the outer surface of the cylinder, and the second heater being connected with the pipeline; and
a third sealing device, arranged in the cylinder;
wherein, the cracking device further comprises a first screw arranged transversely, a second driving device, a barrel body, a propeller, a third driving device and a first bottom plate, the second driving device is used for driving the first screw to rotate, the third driving device is used for driving the propeller to rotate, the barrel body is installed below the first screw, the first bottom plate is installed below the barrel body, and the propeller is located in the barrel body and installed on the first bottom plate; the diameter of the barrel body is smaller than that of the cylinder, an opening of the barrel body faces downward, and a clearance space is formed between the opening of the barrel body and the first bottom plate; and a spindle of the propeller is hollow, wherein a cracked material falls onto the second sealing device through the hollow portion of the spindle;
air guide holes are formed in both of the spindle and the said barrel body;
each of the first sealing device, the second sealing device and the third sealing device comprises a circular column, a plug and a fourth driving device, wherein the outer surface of the circular column is abutted against the inner surface of the cylinder, a guide groove is formed in the middle part of the circular column, and the plug moves up and down along the guide groove, the fourth driving device is used for driving the plug to move, and a plurality of pouring grooves are formed in the circular column and are connected with the guide groove and the bottom of the circular column respectively;
the first stirring paddle comprises a first shaft and a plurality of blade groups, the plurality of blade groups are distributed on the first shaft at intervals, each blade group comprises a plurality of first blades, and the plurality of first blades are circumferentially arranged on the outer surface of the first shaft at intervals; and
wherein the vacuum cracking apparatus is configured:
(1) to feeding waste power batteries from the feed hopper and then entering a roller press for rolling treatment to obtain the crushed material;
(2) to transport the crushed material to the cracking device for preheating, then heating and cracking under an inert atmosphere or vacuum to obtain cracked gas, solid cracked products and non-crackable products;
(3) to transport the solid cracked products and the non-crackable products to the pyrolysis device for pyrolysis at an aerobic atmosphere to obtain pyrolysis gas and non-pyrolysis products, wherein the pyrolysis gas is mainly composed of carbon dioxide and water vapor, the non-pyrolysis products are mainly cathode material powder, anode material powder, copper powder, iron powder, aluminum powder and oxides of copper, iron and aluminum, and the propeller is used for the transmitting upward materials.

2. The vacuum cracking apparatus of claim 1, wherein, each of the pressure roller is provided with a plurality of first hobbing teeth and a plurality of second hobbing teeth with the diameters smaller than those of the first hobbing teeth; and for every two pressure rollers, the first hobbing of the upper pressure roller correspond to the second hobbing of the lower pressure roller, and the second hobbing of the upper pressure roller correspond to the first hobbing of the lower pressure roller.

3. The vacuum cracking apparatus of claim 1, wherein, a feeding device is arranged above the rolling device, is installed on the cylinder and comprises a feed hopper, a discharge port and a sixth driving device; a feed slot is formed in the feed hopper, the bottom of the feed slot is connected with the discharge port, the discharge port is connected with the cylinder, a second screw is arranged in the feed slot, and the sixth driving device is used for driving the second screw to rotate.

4. The vacuum cracking apparatus of claim 1, wherein, the fourth driving device comprises a screw, a worm wheel, a worm and a first motor; a through hole is formed in the middle part of the plug and is provided with threads, the plug is connected with the screw, the screw is connected with the worm wheel, the worm wheel is connected with the worm, and the worm is connected with the first motor.

5. The vacuum cracking apparatus of claim 1, wherein, the upper end surface of the circular column is in a conical shape.

6. The vacuum cracking apparatus of claim 1, wherein, a main view shape of the plurality of the blade groups installed on the first shaft is matched with a shape of the upper end surface of the circular column of the third sealing device.

* * * * *